Sept. 17, 1929.   S. J. HADDAD   1,728,272
TRIMMING AND CUTTING DEVICE
Filed May 15, 1929
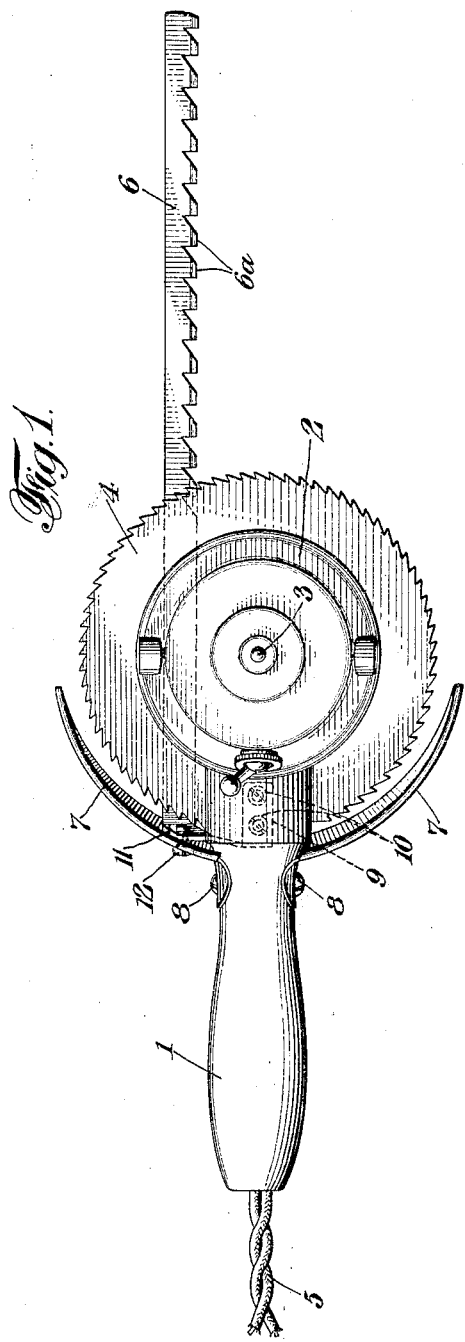
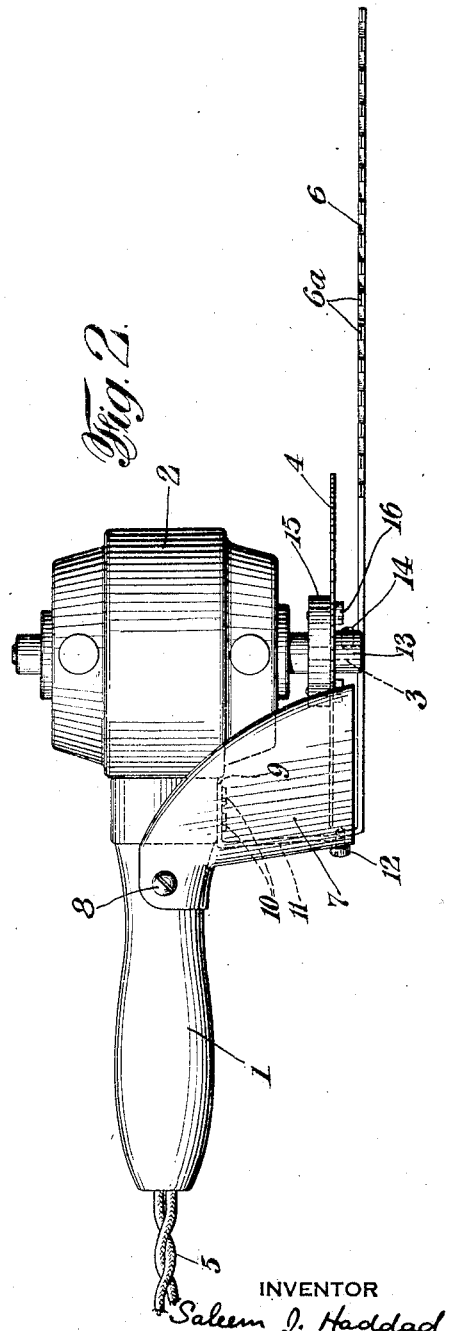
INVENTOR
Saleem J. Haddad
BY
Ward Crosby & Neal
ATTORNEYS Patented Sept. 17, 1929

1,728,272

UNITED STATES PATENT OFFICE

SALEEM J. HADDAD, OF TENAFLY, NEW JERSEY

TRIMMING AND CUTTING DEVICE

Application filed May 15, 1929. Serial No. 363,260.

The invention relates to a portable device adapted to be used for trimming or cutting hedges, and for similar purposes, wherein a continuously driven circular saw is employed and combined with other parts as hereinafter described, enabling the tool to be continuously moved along a hedge to be trimmed in such manner that the twigs will be progressively fed to the saw, cut and thrown clear of the tool without clogging or jamming. Further objects of the invention will be in part obvious and in part specifically pointed out in the specification which, taken in conjunction with the accompanying drawings, discloses a preferred embodiment of the invention. The disclosure, however, is to be considered merely as illustrative of its principles. In the drawings—

Figs. 1 and 2 are respectively a plan view and side elevation of a portable trimming device constructed in accordance with the invention.

In the illustrated form of the invention, the device as a whole is carried by a handle or grip member 1, to which is affixed a mechanism 2, for continuously driving a rotatable shaft 3 carrying a circular saw 4. Particularly where electric power is available, the rotating mechanism 2 preferably takes the form of an electric motor, to which power may be fed in any suitable manner, for example, by the flexible electric cable 5 which is illustrated as extending out from the motor housing through the handle member 1.

In conjunction with the rotating circular saw 4, I employ a guide bar 6 projecting out a substantial distance ahead of the saw, and spaced slightly from it in such manner that as the device as a whole is moved along the hedge in a direction substantially parallel or somewhat oblique to guide bar 6, with the twigs to be cut located on the side edge 6ª of the guide bar toward which the saw teeth are moving, the guide bar will advance the twigs to be cut progressively to the saw, thereby enabling the latter to trim the twigs off and throw them clear of the device. The projecting portion of the guide bar 6 is preferably as long as or longer than the radius of the saw and will aid in securing a smooth and plane trimmed hedge surface since if the guide bar be swept or moved transversely over the surface of the hedge it will be brought to a stop against, and thereby detect projecting twigs to be cut, after which the guide bar will slide along the twigs as the saw is advanced to the cutting position. Preferably the side edge 6ª of the bar is sharpened to assist in cutting the twigs, and notched to hold the adjacent twigs against slipping away from the saw.

I prefer to interpose between the handle member 1 and the circular saw 4, a shield 7 which is shown as fastened to the handle member 1 by screws 8. The guide bar 6 is shown as provided with a heel 9 which is secured to handle member 1 by a screw 10 and an outwardly extending shank 11 which braces the shield 7 and is secured thereto by one or more screws 12.

The saw 4 is shown as secured to the shaft 3 of the motor by means of a hub 13 suitably fixed to the shaft, for example, by a set screw 14, and carrying a flange 15 against which the saw is clamped by screws 16.

During the operation of trimming a hedge or the like, the saw is advanced over the area to be cut and the bar 6 guides and advances the saw into engagement with the twigs. It is obvious that in order to cut a hedge having a substantially plane surface, the apparatus may be swung in an arc to detect uncut projecting twigs which may have been overlooked, whereupon the guide bar will be brought to a stop against such twigs, after which the latter will slide along the bar as the apparatus is moved to the cutting position.

It is found that in the use of a device of the above nature, the combination of the rotary saw member and guide bar 6 enables a hedge trimming or similar operation to be carried on rapidly and evenly.

By use of a non-radial guide bar, ample exposure of the saw to the work is had, and in addition a greater cutting arc of the saw results. With this structure cutting of the hedge is facilitated, since the bar 6 is located to one side of the center of the saw, and therefore, the device affords a greater range of cutting movement.

I claim:

1. A portable trimming device of the class described, comprising a handle member, a circular saw supported by said handle member, a single non-radial guide bar supported by said handle member and being slightly spaced from said saw and extending outwardly beyond the periphery of the latter for a distance at least equal to the radius of said saw, and means for rotating the saw, the bar extending in a position so that a plane through the axis of the bar and at right angles to the saw will define a chord on the saw.

2. A portable trimming device of the class described, comprising a handle member, a circular saw supported by said handle member, a single non-radial guide bar having one end secured to the handle member and extending beneath said saw, said bar having its free end projecting beyond the periphery of said saw for a distance at least equal to the radius of said saw, the bar extending in a position so that a plane through the axis of the bar and at right angles to the saw will define a chord on the saw.

3. A portable trimming device of the class described, comprising a handle member, a circular saw supported by said handle member, a single non-radial guide bar supported by said handle member and extending outwardly beyond the periphery of said saw and provided with a plurality of notches along one of its edges, and means for rotating said saw, the bar extending in a position so that a plane through the axis of the bar and at right angles to the saw will define a chord on the saw.

4. A portable trimming device of the class described, comprising a handle member, a circular saw supported by said handle member, a single non-radial guide bar supported by said handle member and having a portion thereof extending beyond the periphery of the saw, said bar being provided with a plurality of sharpened teeth along one of its edges, and means for rotating the saw, the bar extending in a position so that a plane through the axis of the bar and at right angles to the saw will define a chord on the saw.

5. A portable trimming device of the class described, comprising a handle member, a circular saw supported by said handle member, a single non-radial guide bar supported by said handle member and disposed to one side of the axis of said saw and having a portion extending beyond the periphery of said saw, one edge of said bar being sharpened, and means for rotating the saw, the bar extending in a position so that a plane through the axis of the bar and at right angles to the saw will define a chord on the saw.

In testimony whereof I have signed my name to this specification.

SALEEM J. HADDAD.